United States Patent
Sennett et al.

(10) Patent No.: US 9,980,110 B2
(45) Date of Patent: May 22, 2018

(54) SUPPLEMENTING BROADCAST MESSAGES

(71) Applicant: AT&T Intellectual Property I, L.P., Atlanta, GA (US)

(72) Inventors: DeWayne A. Sennett, Redmond, WA (US); Brian Kevin Daly, Peachtree Corners, GA (US); Charles Peter Musgrove, Henderson, NV (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days. days.

(21) Appl. No.: 14/829,377

(22) Filed: Aug. 18, 2015

(65) Prior Publication Data

US 2017/0055139 A1    Feb. 23, 2017

(51) Int. Cl.
*H04M 11/04* (2006.01)
*H04W 4/22* (2009.01)
*H04W 4/06* (2009.01)
*H04M 1/725* (2006.01)

(52) U.S. Cl.
CPC ............. *H04W 4/22* (2013.01); *H04W 4/06* (2013.01); *H04M 1/72536* (2013.01)

(58) Field of Classification Search
CPC ........... G06Q 30/0261; G06Q 30/0269; G06Q 10/0833; G06Q 50/26; G06Q 99/00; G06Q 30/0205; G06Q 30/0613; H04W 4/22; H04W 4/021; H04W 4/06; H04W 4/12; H04W 72/005; H04W 4/08; H04W 4/02; H04W 52/0235; H04W 76/007; H04W 64/00; H04W 88/04; H04W 8/22; H04W 24/04; H04W 48/10; H04W 48/12; G08B 25/002; G08B 25/016; G08B 27/00; G08B 25/10; G08B 27/006; G08B 7/066
See application file for complete search history.

(56) References Cited

U.S. PATENT DOCUMENTS

| | | | |
|---|---|---|---|
| 6,745,021 B1 * | 6/2004 | Stevens | H04M 3/42 455/404.1 |
| 7,602,277 B1 | 10/2009 | Daly et al. | |
| 8,063,766 B2 | 11/2011 | Daly et al. | |
| 8,478,225 B2 | 7/2013 | Sennett et al. | |
| 8,532,607 B2 | 9/2013 | Sennett et al. | |
| 8,554,171 B2 | 10/2013 | Sennett et al. | |
| 8,676,153 B2 | 3/2014 | Sennett et al. | |
| 8,989,698 B2 | 3/2015 | Fan et al. | |
| 2007/0021099 A1 * | 1/2007 | Sato | H04B 1/3805 455/404.1 |
| 2009/0233634 A1 * | 9/2009 | Aghili | H04W 76/007 455/466 |
| 2009/0291630 A1 | 11/2009 | Dunn et al. | |
| 2010/0159870 A1 * | 6/2010 | Jokinen | H04W 76/007 455/404.1 |
| 2010/0297931 A1 * | 11/2010 | Ueno | G08B 27/008 455/3.01 |
| 2012/0327837 A1 | 12/2012 | Harrington et al. | |

(Continued)

*Primary Examiner* — Nimesh Patel
(74) *Attorney, Agent, or Firm* — Baker & Hostetler LLP

(57) ABSTRACT

A method includes receiving a broadcast message and determining a type of the broadcast message. The operations include, if the broadcast message is a first type, retrieving data indicated by the broadcast message. The operations include, if the broadcast message is a second type, changing a device operating characteristic.

10 Claims, 11 Drawing Sheets

(56) References Cited

U.S. PATENT DOCUMENTS

| | | | |
|---|---|---|---|
| 2014/0050137 A1* | 2/2014 | Alberth, Jr. | H04W 4/22 370/312 |
| 2014/0051379 A1* | 2/2014 | Ganesh | H04M 1/72538 455/404.1 |
| 2014/0273912 A1 | 9/2014 | Peh et al. | |
| 2015/0044983 A1 | 2/2015 | Nasir et al. | |
| 2015/0237657 A1* | 8/2015 | Igarashi | H04W 76/007 455/404.2 |

* cited by examiner

SUPPLEMENTING BROADCAST MESSAGES

TECHNICAL FIELD

The technical field generally relates to broadcast messages and, more specifically, to systems and methods for obtaining supplemental information based on a broadcast message.

BACKGROUND

Broadcast messages may include those sent to all mobile devices in a geographic area that subscribe to a broadcast service. A popular use for broadcast messages is emergency alerts. For example, wireless emergency alerts (WEA) (formerly known as the Commercial Mobile Alert System (CMAS) or Personal Localized Alerting Network (PLAN)), which is part of FEMA's Integrated Public Alert and Warning System (IPAWS) is a public safety system that allows WEA-enabled mobile devices to receive broadcast messages alerting users of imminent threats to safety in their geographic area. Under current FCC regulations, the size and data type of the alert are constrained. However, emergency managers may want to provide additional information that cannot fit into the constraints of WEA messages. Further, with respect to WEA messages, the functionality of the mobile devices is limited to receiving and displaying the message. Current operating systems do not provide access to other applications on a mobile device to the data received in the WEA message (or other broadcast messages). There is a need for alternative or supplemental methods and systems for providing information to mobile devices in the event of an emergency.

SUMMARY

The disclosed systems and methods allow for mobile devices to react to broadcast messages. The present disclosure provides devices and methods for determining a type of broadcast message received and performing operations indicated by the content and type of the broadcast message. If, for example, the broadcast message indicates that additional data should be retrieved from the network (e.g., the mobile device should access a particular URL), the disclosed devices and methods provide the functionality for the mobile device to detect and act in response to a broadcast message.

The present disclosure is directed to a device that may include a processor and a memory coupled to the processor. The memory may include executable instructions that, when executed by the processor, cause the processor to effectuate operations including receiving a broadcast message and determining a type of the broadcast message. The operations may include, if the broadcast message is a first type, retrieving data indicated by the broadcast message. The operations may include, if the broadcast message is a second type, changing an operating characteristic of the device.

The present disclosure is also directed to a method comprising receiving a broadcast message and determining a type of the broadcast message. The operations may include, if the broadcast message is a first type, retrieving data indicated by the broadcast message. The operations may include, if the broadcast message is a second type, changing a device operating characteristic.

The present disclosure is also directed to a computer-readable storage medium comprising executable instructions that, when executed by a processor, cause the processor to effectuate operations. The operations may include receiving a broadcast message and determining a type of the broadcast message. The operations may include, if the broadcast message is a first type, retrieving data indicated by the broadcast message. The operations may include, if the broadcast message is a second type, changing a device operating characteristic.

BRIEF DESCRIPTION OF THE DRAWINGS

Aspects of the herein described telecommunications network are described more fully with reference to the accompanying drawings, which provide examples. In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

DETAILED DESCRIPTION

Figure 1:
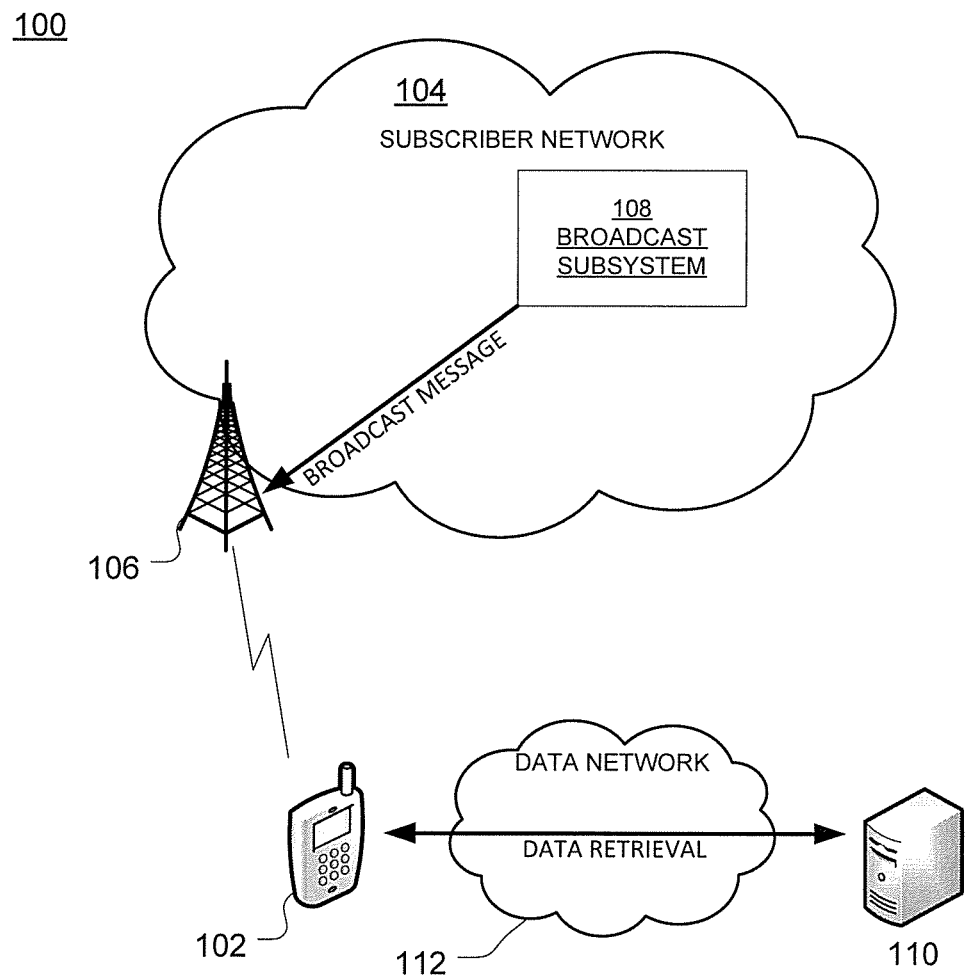
FIG. 1 illustrates an exemplary telecommunication system in which a mobile device may receive and react to a broadcast message.

FIG. 1 illustrates an exemplary telecommunication system 100 including a mobile device 102. In the context of the present disclosure, mobile device 102 may comprise any appropriate type of user equipment (UE), such as, for example, a mobile device, a tablet, a smart phone, or any type of equipment capable of providing voice and/or data connectivity. Mobile device 102 may be registered on the relevant network. It is to be understood that mobile device 102 as depicted herein is exemplary and not intended to be limiting. Acronyms are used throughout the disclosure that will be understood by those skilled in the art.

FIG. 1 illustrates a telecommunication system 100, which may include a mobile device 102. Mobile device 102 may communicate through a subscriber network 104 (e.g., long term evolution (LTE), 5G, etc.) via a base station 106 to a broadcast subsystem 108. For example, mobile device 102 may receive a broadcast message from broadcast subsystem 108. Further, telecommunication system 100 may include other devices, such as a data source 110, with which mobile device 102 may communicate. Data source 110 may include any device capable of storing information, such as a server. Mobile device 102 may communicate with other devices, like data source 110 through subscriber network 104 or through other networks. For example, mobile device 102 may communicate with data source 110 through a data network 112.

Broadcast subsystem 108 may receive or create messages to be broadcast to devices in a particular geographic area. For example, broadcast subsystem 108 may provide a broadcast message to one or more base stations 106. In turn, base station 106 may broadcast the message to devices within its zone of coverage. Base station 106 may use radio frequency (RF) to broadcast the message. Once it receives the broadcast message, mobile device 102 may react. For example, mobile device 102 may seek additional data from other network-connected devices, such as data source 110.

Figure 2:
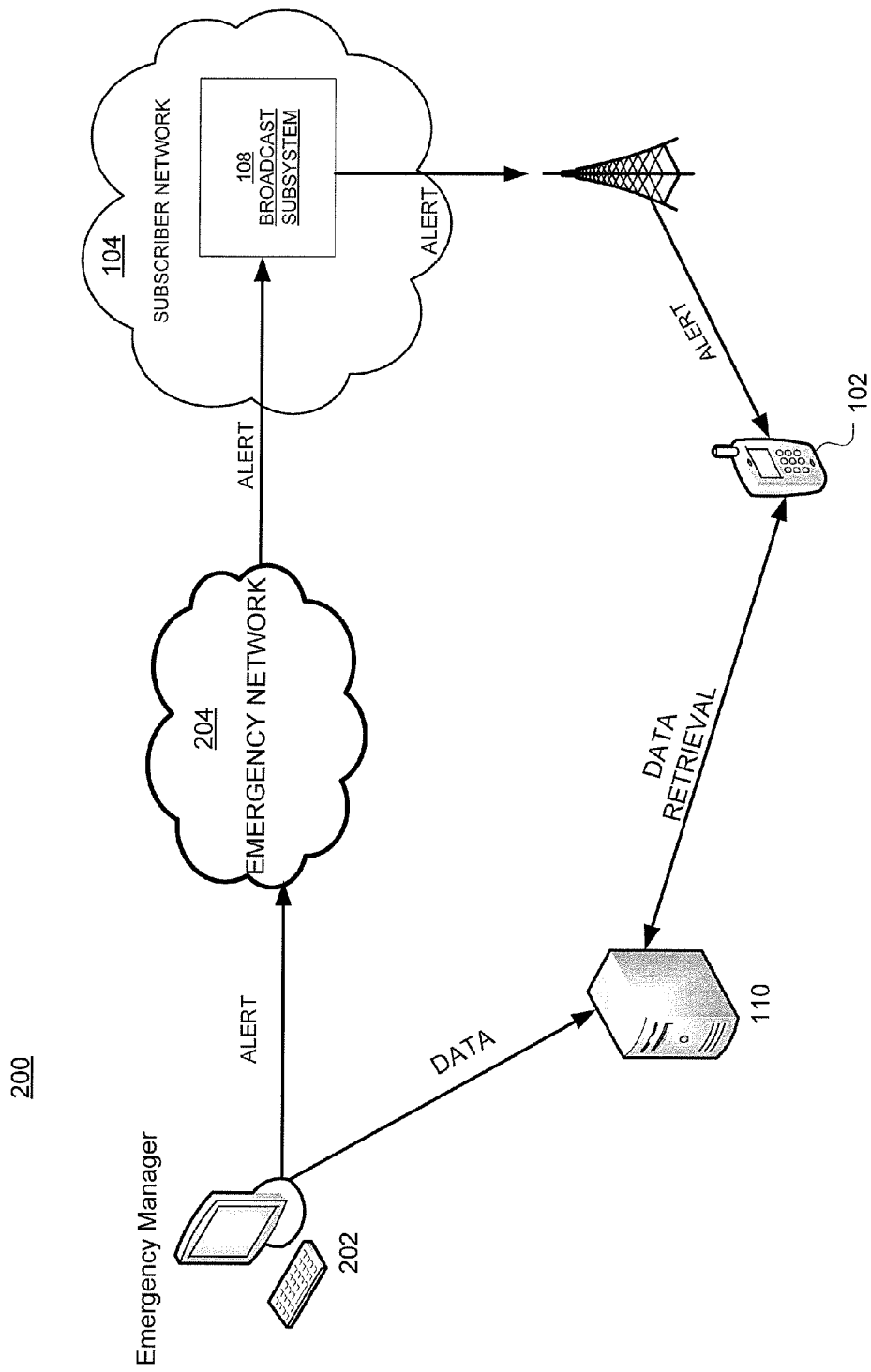
FIG. 2 illustrates an exemplary telecommunication system in which a mobile device may receive a WEA message.

FIG. 2 illustrates a telecommunication system 200 in which mobile device 102 may receive broadcast alerts from an emergency manager 202. As an example, the broadcast alert may be a WEA message. Emergency manager 202 may be any device that is capable of generating a data communication to be delivered via broadcast. Emergency manager 202 may provide an alert message through an emergency network 204 to broadcast subsystem 108. For example, emergency network 204 may be a network established as part of IPAWS. Emergency network 204 may be any network through which emergency manager 202 may communicate to broadcast subsystem 104. Mobile device 102 may communicate through subscriber network 104 (e.g., long term evolution (LTE), 5G, etc.) via a base station 106 to a broadcast subsystem 108. For example, mobile device 102 may receive a broadcast message from broadcast subsystem 108. Further, telecommunication system 200 may include other devices, such as data source 110, with which mobile device 102 may communicate. Mobile device 102 may communicate with other devices, like data source 110 through subscriber network 104 or through other networks. Additionally or alternatively emergency manager 202 may be configured to communicate with other devices. For example, emergency manager 202 may be configured to communicate data to data source 110. More specifically, as another example, emergency manager 202 may transmit data to data source 110 that is related to the WEA alert provided to broadcast subsystem 108. In this example, the WEA alert may provide instruction to mobile device 102 to access data from data source 102.

It is to be understood that telecommunication systems 100 and 200 as depicted in FIGS. 1 and 2 are exemplary and not intended to be limiting.

Figure 3:
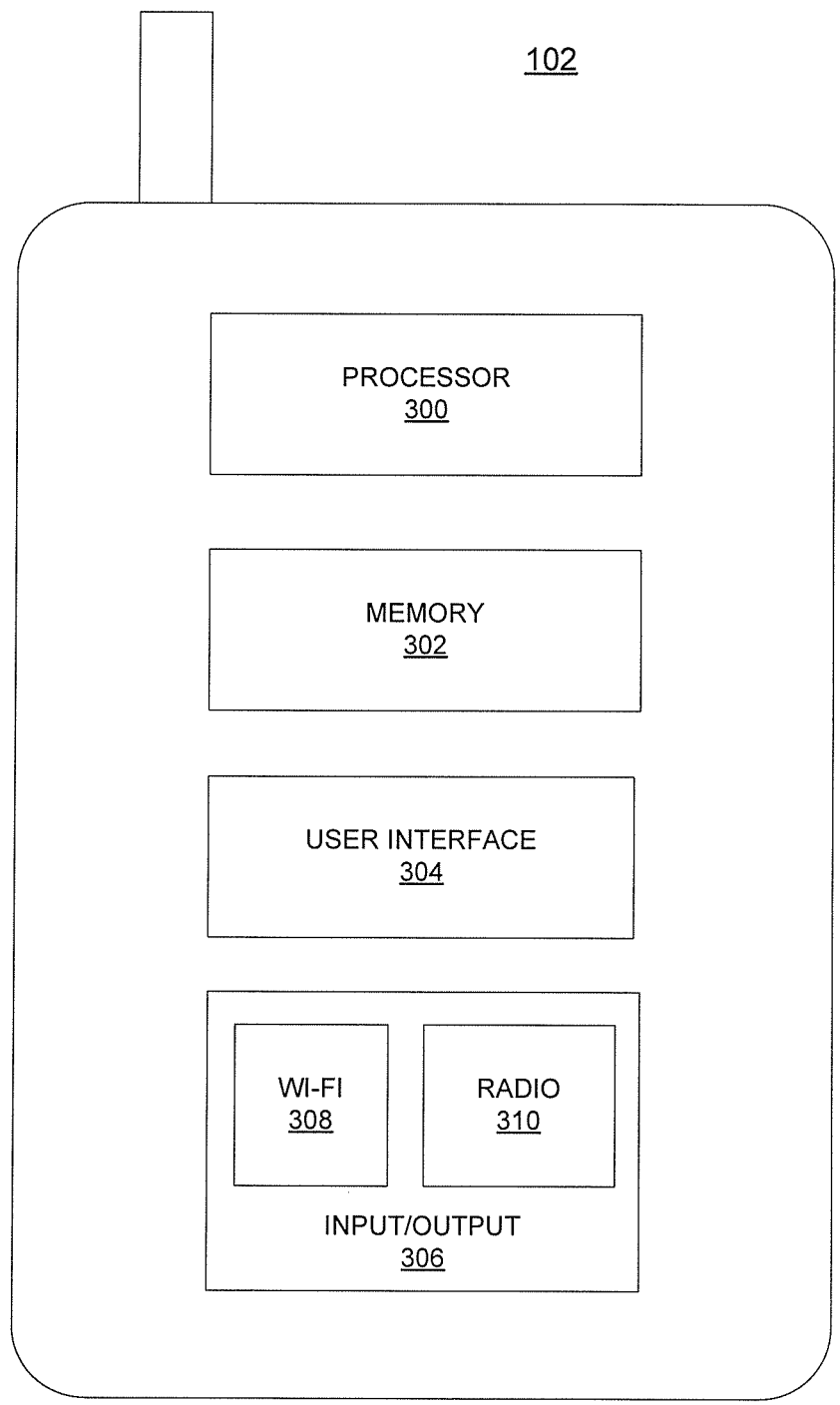
FIG. 3 is a schematic of an exemplary mobile device that may receive and react to a broadcast message.

FIG. 3 is a block diagram of an exemplary mobile device 102 that may be utilized with a telecommunication network as described herein. Mobile device 102 may comprise or be incorporated into any appropriate device, examples of which may include a mobile device, a mobile communications device, a cellular phone, a portable computing device, such as a laptop, a personal digital assistant (PDA), a portable phone (e.g., a cell phone or the like, a smart phone, a video phone), a portable email device, a portable gaming device, a TV, a DVD player, portable media player, (e.g., a portable music player, such as an MP3 player or a Walkman), a portable navigation device (e.g., GPS compatible device, A-GPS compatible device), or a combination thereof. Mobile device 102 can include devices that are not typically thought of as portable, such as, for example, a public computing device, a navigation device installed in-vehicle, a set top box, or the like. Mobile device 102 can include nonconventional computing devices, such as, for example, a kitchen appliance, a motor vehicle control (e.g., steering wheel), or the like. As evident from the herein description, UE, a device, a communications device, or a mobile device is not to be construed as software per se.

Mobile device 102 may include any appropriate device, mechanism, software, or hardware for communicating with a telecommunication network as described herein. In an example configuration, mobile device 102 may comprise portions including a processor 300, a memory 302, a user interface (UI) 304, or an input/output 306. Each portion of mobile device 102 may comprise circuitry for performing functions associated with each respective portion. Thus, each portion may comprise hardware or a combination of hardware and software. Accordingly, each portion of mobile device 102 is not to be construed as software per se. It is emphasized that the block diagram depiction of mobile device 102 is exemplary and not intended to imply a specific implementation or configuration. For example, in an example configuration, mobile device 102 may comprise a cellular communications technology, and processor 300 or memory 302 may be implemented, in part or in total, on a subscriber identity module (SIM) of the mobile device 102. In another example configuration, mobile device 102 may comprise a laptop computer. The laptop computer may include a SIM, and various portions of processor 300 or memory 302 may be implemented on the SIM, on the laptop other than the SIM, or any combination thereof.

Processor 300, memory 302, and input/output 306 may be coupled together (coupling not shown in FIG. 2) to allow communications therebetween. Input/output 306 may comprise a receiver of mobile device 102, a transmitter of mobile device 102, or a combination thereof. Input/output 306 may be capable of receiving or providing information pertaining to telecommunications as described herein. In various configurations, input/output 306 may receive or provide information via any appropriate means, such as, for example, optical means (e.g., infrared), electromagnetic means (e.g., radio frequency (RF), Wi-Fi, Bluetooth®, ZigBee®), acoustic means (e.g., speaker, microphone, ultrasonic receiver, ultrasonic transmitter), or a combination thereof. For example, as shown in FIG. 3, input/output 306 may include one or more wireless radios, such as Wi-Fi radio 308. For example, input/output 306 may include one or more wireless radios dedicated to broadcast messages, for example, those receiving RF signals, such as a radio 310.

Processor 300 may be capable of performing functions pertaining to telecommunications, including, for example, communicating with other devices in or connected to subscriber network 104. In a basic configuration, mobile device 102 may include at least one memory 302, which may comprise executable instructions that, when executed by processor 300, cause processor 300 to effectuate operations associated with a telecommunication network, such as subscriber network 104. Memory 302 may comprise a storage medium having a concrete, tangible, physical structure. As is known, a signal does not have a concrete, tangible, physical structure. Memory 302, as well as any computer-readable storage medium described herein, is not to be construed as a signal. Memory 302, as well as any computer-readable storage medium described herein, is not to be construed as a transient signal. Further, memory 302, as well as any computer-readable storage medium described herein, is not to be construed as a propagating signal. Memory 302, as well as any computer-readable storage medium described herein, is to be construed as an article of manufacture.

Memory 302 may store any information utilized in conjunction with telecommunications. Depending upon the exact configuration or type of processor, memory 302 may be volatile (such as some types of RAM), nonvolatile (such as ROM or flash memory), or a combination thereof. Mobile device 102 may include additional storage (e.g., removable storage or nonremovable storage) including, but not limited to, tape, flash memory, smart cards, CD-ROM, DVD, or other optical storage, magnetic cassettes, magnetic tape, magnetic disk storage or other magnetic storage devices, universal serial bus (USB) compatible memory, or any other medium which can be used to store information and which can be accessed by mobile device 102.

Mobile device 102 also may contain UI 304 to allow a user to communicate with it. UI 304 may be capable of rendering any information utilized in conjunction with telecommunications. UI 304 may provide the ability to control mobile device 102, via, for example, buttons, soft keys, voice actuated controls, a touch screen, movement of mobile device 102, visual cues (e.g., moving a hand in front of a camera on mobile device 102), or the like. UI 304 may provide visual information (e.g., via a display), audio information (e.g., via speaker), mechanically (e.g., via a vibrating mechanism), or a combination thereof. In various configurations, UI 304 may comprise a display, a touch screen, a keyboard, an accelerometer, a motion detector, a speaker, a microphone, a camera, a tilt sensor, or any combination thereof. UI 304 may comprise means for inputting biometric information, such as, for example, fingerprint information, retinal information, voice information, or facial characteristic information.

UI 304 may include a display for displaying multimedia such as, for example, application graphical user interfaces, text, images, video, telephony functions such as Caller ID data, setup functions, menus, music, metadata, messages, wallpaper, graphics, Internet content, device status, preferences settings, map or location data, routes or other directions, points of interest, or the like.

Mobile device 102 may be used to receive a broadcast message, such as a WEA message, through subscriber network 104 from a sender, such as broadcast system 108. It may be advantageous for mobile device 102 or another device in or connected to mobile network 104 or broadcast system 108 to communicate the location of mobile device 102 to broadcast system 108.

Figure 4:
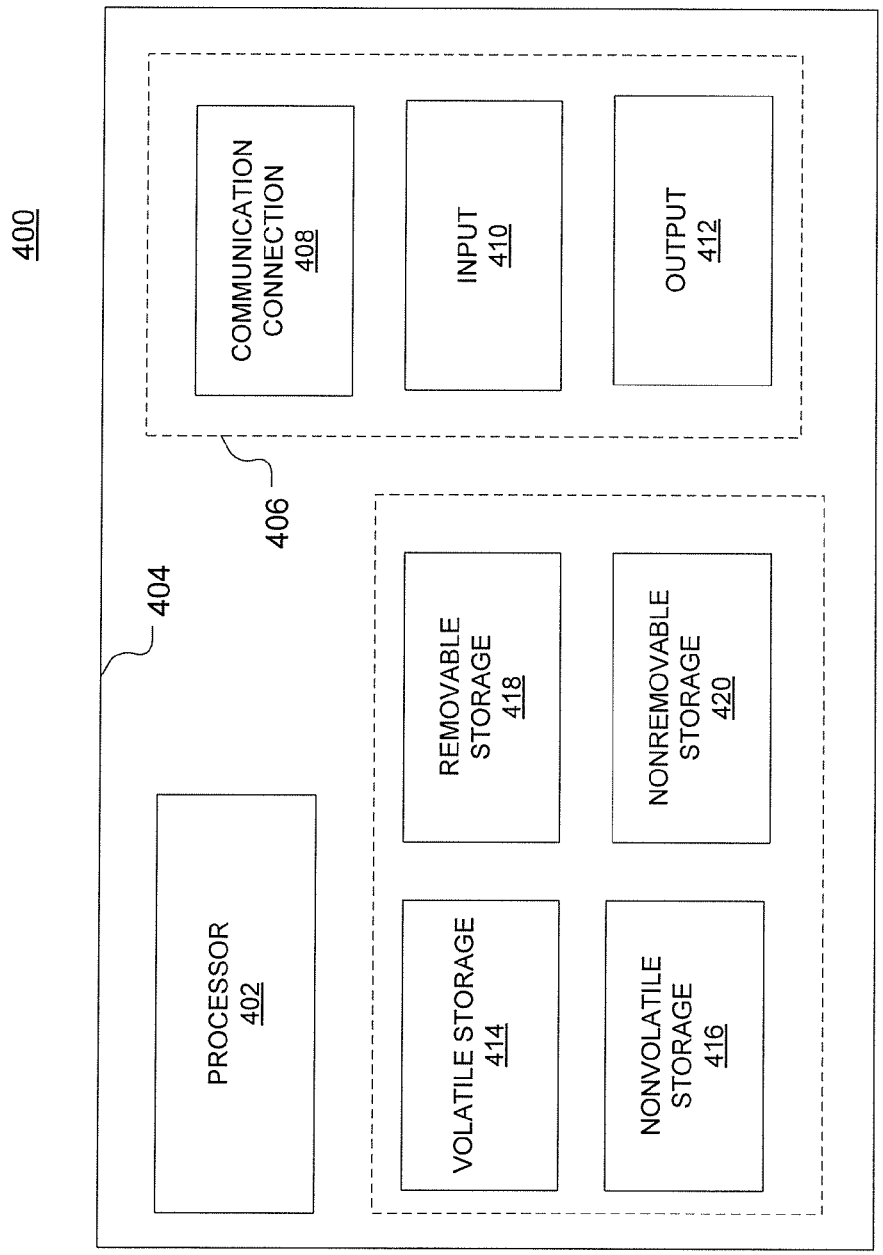
FIG. 4 is a schematic of an exemplary network entity.

FIG. 4 is a block diagram of network entity 400 of a telecommunication network (e.g., subscriber network 104) as described herein. For example, broadcast system 108 may comprise, include, or communicate with network entity 400. Network entity 400 may comprise hardware or a combination of hardware and software. The functionality to facilitate telecommunications via a telecommunications network may reside in any one or combination of network entities 400. Network entity 400 depicted in FIG. 4 may represent or perform functionality of any appropriate network entity 400, or combination of network entities 400, such as, for example, a component or various components of a cellular broadcast system wireless network, a processor, a server, a gateway, a node, a mobile switching center (MSC), a short message service center (SMSC), an ALFS, a gateway mobile location center (GMLC), a radio access network (RAN), a SMLC, or the like, or any appropriate combination thereof. It is emphasized that the block diagram depicted in FIG. 4 is exemplary and not intended to imply a specific implementation or configuration. Thus, network entity 400 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network entity 400 may comprise a processor 402 and a memory 404 coupled to processor 402. Memory 404 may contain executable instructions that, when executed by processor 402, cause processor 402 to effectuate operations associated with telecommunications via subscriber network 104. As evident from the description herein, network entity 400 is not to be construed as software per se.

In addition to processor 402 and memory 404, network entity 400 may include an input/output system 406. Processor 402, memory 404, and input/output system 406 may be coupled together (coupling not shown in FIG. 4) to allow communications therebetween. Each portion of network entity 400 may comprise circuitry for performing functions associated with each respective portion. Thus, each portion may comprise hardware, or a combination of hardware and software. Accordingly, each portion of network entity 400 is not to be construed as software per se. Input/output system 406 may be capable of receiving or providing information from or to a communications device or other network entities configured for telecommunications. For example input/output system 406 may include a wireless communications (e.g., 2.5G/3G/4G/GPS) card. Input/output system 406 may be capable of receiving or sending video information, audio information, control information, image information, data, or any combination thereof. Input/output system 406 may be capable of transferring information with network entity 400. In various configurations, input/output system 406 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 406 may comprise a Wi-Fi finder, a two-way GPS chipset or equivalent, or the like, or a combination thereof.

Input/output system 406 of network entity 400 also may contain communication connection 408 that allows network entity 400 to communicate with other devices, network entities, or the like. Communication connection 408 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 406 also may include an input device 410 such as keyboard, mouse, pen, voice input device, or touch input device. Input/output system 406 may also include an output device 412, such as a display, speakers, or a printer.

Processor 402 may be capable of performing functions associated with telecommunications, such as functions for processing broadcast messages, as described herein. For example, processor 402 may be capable of, in conjunction with any other portion of network entity 400, determining a type of broadcast message and acting according to the broadcast message type or content, as described herein.

Memory 404 of network entity 300 may comprise a storage medium having a concrete, tangible, physical structure. As is known, a signal does not have a concrete, tangible, physical structure. Memory 404, as well as any computer-readable storage medium described herein, is not to be construed as a signal. Memory 404, as well as any computer-readable storage medium described herein, is not to be construed as a transient signal. Memory 404, as well as any computer-readable storage medium described herein, is not to be construed as a propagating signal. Memory 404, as well as any computer-readable storage medium described herein, is to be construed as an article of manufacture.

Memory 404 may store any information utilized in conjunction with telecommunications. Depending upon the exact configuration or type of processor, memory 404 may include a volatile storage 414 (such as some types of RAM), a nonvolatile storage 416 (such as ROM, flash memory), or a combination thereof. Memory 404 may include additional storage (e.g., a removable storage 418 or a nonremovable storage 420) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network entity 400. Memory 404 may comprise executable instructions that, when executed by processor 402, cause processor 402 to effectuate operations to provide broadcast messages to devices through subscriber network 104.

Figure 5:
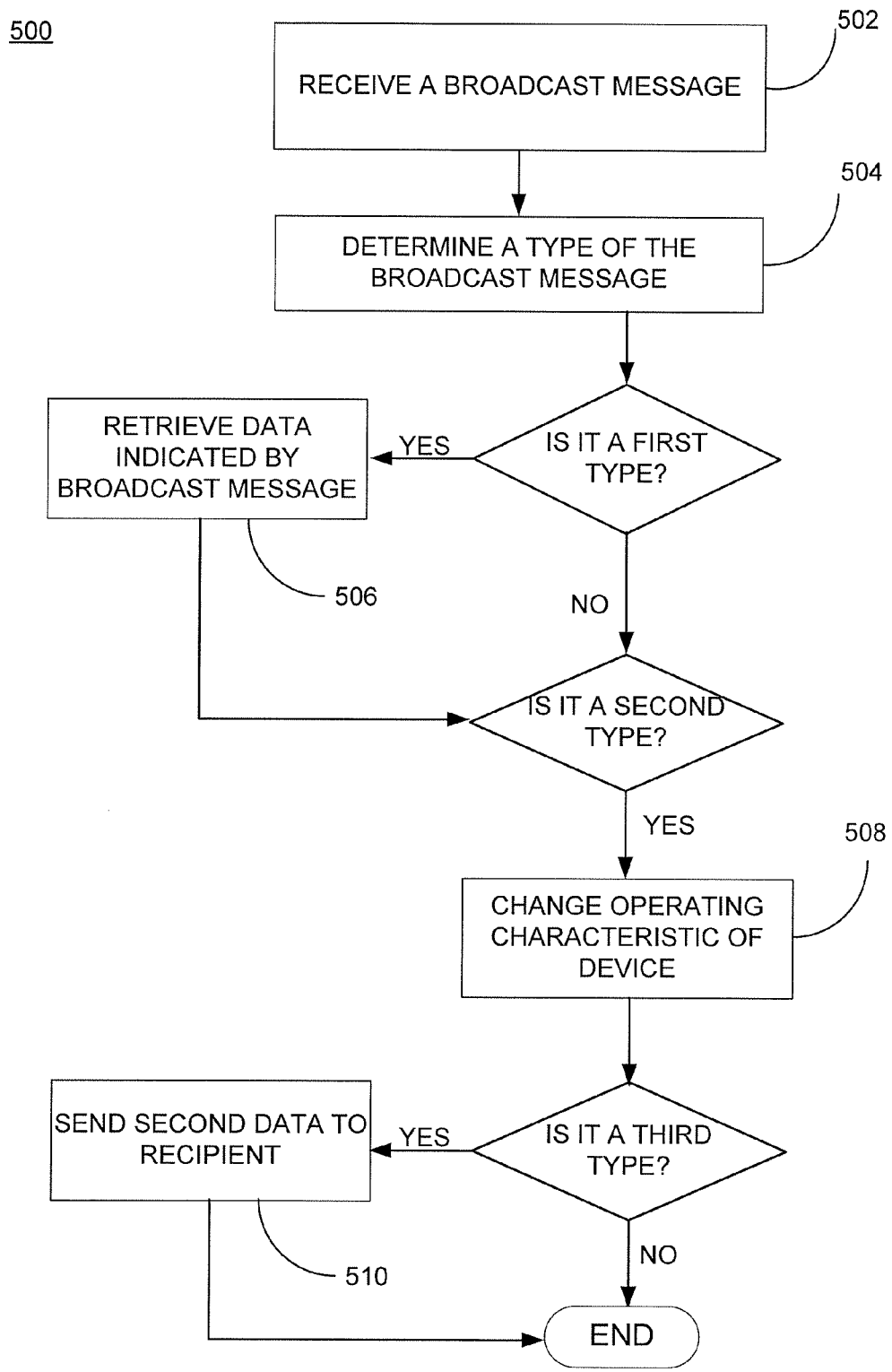
FIG. 5 is a flowchart of an exemplary process for receiving and reacting to a broadcast message.

FIG. 5 is a flowchart of an exemplary process 500 for reacting to a broadcast message. Process 500 may be implemented by mobile device 102. At step 502, process 500 may include receiving a broadcast message. For example, mobile device 102 may receive a broadcast message via base station 108. Base station 108 may broadcast the broadcast message to all devices in its zone of coverage. The broadcast message may be created by any device(s) capable of communicating to/within subscriber network 104. For example, broadcast subsystem 108 or emergency manager 202 may create the broadcast message.

At step 504, process 500 may include determining a type of the broadcast message. A broadcast message may have more than one type. The type of the broadcast message may be a specific category (e.g., emergency alert, advertisement, instruction to update software, instruction to perform function, etc.). Additionally or alternatively, the categories may be broad. For example, a first type may include all messages that indicate that additional data should be obtained. For example, the instruction may identify a particular source of this data. This instruction may take the form of a URL or other address from which the additional data should be retrieved by the recipient of the broadcast message. The data to be retrieved may be content (e.g., text, images, video, sound, etc.). This content may optionally be displayed on mobile device 102. Additionally or alternatively, the data may be software, such as an operating system update or a software patch. The second category may include broadcast messages that indicate other types of data be retrieved by mobile device 102.

A second type of broadcast message may include all messages that indicate that an operating characteristic of mobile device 102 should be altered. For example, the broadcast message may instruct software to be installed or updated. This software may already be on mobile device 102, or the broadcast message may indicate where the software should be obtained. This may include new operating system updates. The broadcast message may instruct that software be altered or deleted. This may include changes to the settings of software (e.g., applications) on mobile device 102. It may also include removing software, including applications, like those that are no longer supported, or viruses. The broadcast message may instruct a setting of mobile device 102 to be changed. For example, the broadcast message may indicate that a GPS system of mobile device 102 may be turned on. Additionally or alternatively, the broadcast message may indicate that an application on mobile device 102 be turned on or off. The broadcast message may instruct mobile device 102 to go into a different operating mode, such as a low power mode, or to power off all or part of mobile device 102. The broadcast message may instruct for mobile device 102 to change a power level of all or part of mobile device 102. For example, the message may indicate that additional power be provided to a speaker of input/output 306. Additionally or alternatively, the broadcast message 102 may instruct mobile device 102 to display data, such as data contained or indicated by the broadcast message, or data already existing on mobile device 102. The second category may include broadcast messages that indicate any other operating characteristics of mobile device 10 be changed.

A third type of broadcast messages may instruct mobile device 102 to transmit certain data. Due to the nature of broadcasting, broadcast subsystem 108 may not know which specific mobile devices 102 received broadcast message. Thus, the broadcast message may indicate that mobile device 102 transmits an identifier associated with mobile device 102, such as an IMEI, a MAC address, or an IP address. As another example, it may be advantageous for the locations of mobile devices 102 receiving the broadcast message be known. Thus, the broadcast message may indicate that mobile device 102 transmit its location. The third category may include broadcast messages that include indications that mobile device 102 transmit any type of data, including data not stored on mobile device 102 or data created by mobile device 102 after receiving the broadcast message.

A broadcast message may belong to one or more categories (types) of broadcast message. For example, a broadcast message instructing mobile device 102 to retrieve a software update and to install the software update may belong to the first and second categories. Further, broadcast messages may also include other features not specific to the category/categories to which it belongs. For example, a broadcast message may also include a communication to be displayed by mobile device 102. As another example, a broadcast message may be an emergency alert (such as a WEA message) that contains both an indication of additional data to be obtained (e.g., from data source 110) and a communication (the alert) to be displayed to the user. The communication may indicate an emergency (e.g., weather advisory, terrorist attack, Amber Alert, etc.). The data may include additional information related to the emergency (e.g. a weather map, evacuation route, a photograph of the missing child, etc.). Optionally, the data may be retrieved by mobile device 102 through a different communication channel than the emergency alert was received.

Step 504 may be performed in a number of ways. For example, mobile device 102 may determine the type of the broadcast message by a type indicator included in the broadcast message. As another example, mobile device 102 may determine that a broadcast message is of the first type (instructing that additional data be retrieved) by the presence of a URL or other address in the broadcast message.

If the broadcast message is the first type, at step 506, process 500 includes retrieving data indicated by the broadcast message. The broadcast message may indicate the data in any appropriate way. For example, the broadcast may include a specific location where the data is available.

Additionally or alternatively, it may provide a file name of the data that mobile device 102 may use to locate the data. Once it is determined that the message is the first type, process 500 may end (not shown), or, as shown in FIG. 5, it may continue to determine whether the message has more than one type.

If the broadcast message is the second type, at step 508, process 500 includes changing an operating characteristic of mobile device 102. This may include installing/uninstalling software, such as, for example, operating systems, scripts, or applications, including software updates. It may include changing whether software is running. For example, changing the operating characteristic may include closing or opening an application. The operating characteristic may be a setting on mobile device 102, such as a general operating setting (e.g., screen brightness), turning on/off a specific feature (e.g., WiFi radio 308), a setting of a specific application (e.g., allowing an application to access device location data). At step 508, mobile device 102 may perform these or any other changes. Once it is determined that the message is the first type, process 500 may end (not shown), or, as shown in FIG. 5, it may continue to determine whether the message has more than one type.

If the broadcast message is the third type, at step 510, process 500 includes sending a second data to a recipient. Depending on the second data identified by the broadcast message, step 510 may include generating data. For example, the second data may be an image to be captured by a camera of mobile device 102. The second data may be data stored on mobile device 102. For example, the broadcast message may indicate that mobile device 102 transmits an identifier associated with mobile device 102, such as an IMEI, a MAC address, or an IP address. As another example, it may be advantageous for the locations of mobile devices 102 receiving the broadcast message be known. Thus, the broadcast message may indicate that mobile device 102 transmit its location. The third category may include broadcast messages that include indications that mobile device 102 transmit any type of data, including data not stored on mobile device 102 or data created by mobile device 102 after receiving the broadcast message.

Figure 6:
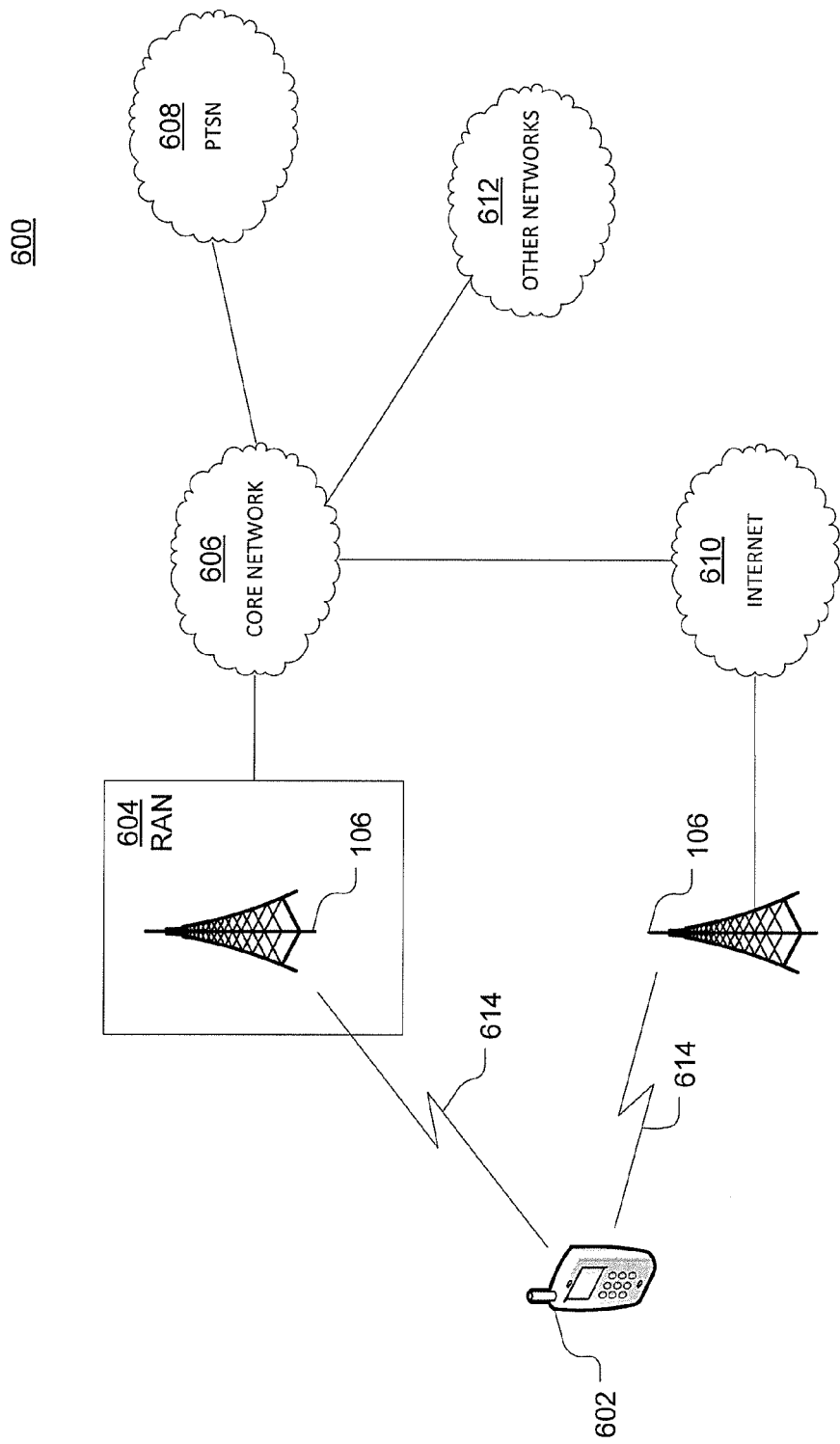
FIG. 6 is a diagram of an exemplary telecommunications system in which the disclosed methods and processes may be implemented.

As shown in FIG. 6, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may comprise mobile device 102, network entity 400, or the like, or any combination thereof. By way of example, WTRUs 602 may be configured to transmit or receive wireless signals and may include a UE, a mobile station, a mobile device, a fixed or mobile subscriber unit, a pager, a cellular telephone, a PDA, a smartphone, a laptop, a netbook, a personal computer, a wireless sensor, consumer electronics, or the like.

Telecommunication system 600 may also include one or more base stations 106. Each of base stations 106 may be any type of device configured to wirelessly interface with at least one of the WTRUs 602 to facilitate access to one or more communication networks, such as core network 606, PTSN 608, Internet 610, or other networks 612. By way of example, base stations 106 may be a base transceiver station (BTS), a Node-B, an eNode B, a Home Node B, a Home eNode B, a site controller, an access point (AP), a wireless router, or the like. While base stations 106 are each depicted as a single element, it will be appreciated that base stations 106 may include any number of interconnected base stations or network elements.

RAN 604 may include one or more base stations 106, along with other network elements (not shown), such as a base station controller (BSC), a radio network controller (RNC), or relay nodes. One or more base stations 106 may be configured to transmit or receive wireless signals within a particular geographic region, which may be referred to as a cell (not shown). The cell may further be divided into cell sectors. For example, the cell associated with base station 106 may be divided into three sectors such that base station 106 may include three transceivers: one for each sector of the cell. In another example, base station 106 may employ multiple-input multiple-output (MIMO) technology and, therefore, may utilize multiple transceivers for each sector of the cell.

Base stations 106 may communicate with one or more of WTRUs 602 over an air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 106 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 106 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 106 and WTRUs 602 connected to RAN 604 may implement radio technologies such as IEEE 602.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 106 may be a wireless router, Home Node B, Home eNode B, or access point, for example, and may utilize any suitable RAT for facilitating wireless connectivity in a localized area, such as a place of business, a home, a vehicle, a campus, or the like. For example, base station 106 and associated WTRUs 602 may implement a radio technology such as IEEE 602.11 to establish a wireless local area network (WLAN). As another example, base station 106 and associated WTRUs 602 may implement a radio technology such as IEEE 602.15 to establish a wireless personal area network (WPAN). In yet another example, base station 106 and associated WTRUs 602 may utilize a cellular-based RAT (e.g., WCDMA, CDMA2000, GSM, LTE, LTE-A, etc.) to establish a picocell or femtocell. As shown in FIG. 6, base station 106 may have a direct connection to Internet 610. Thus, base station 106 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 6, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. That is, WTRUs 602 may include multiple transceivers for communicating with different wireless networks over different wireless links. For example, one or more WTRUs 602 may be configured to communicate with base station 106, which may employ a cellular-based radio technology, and with base station 106, which may employ an IEEE 802 radio technology.

Figure 7:
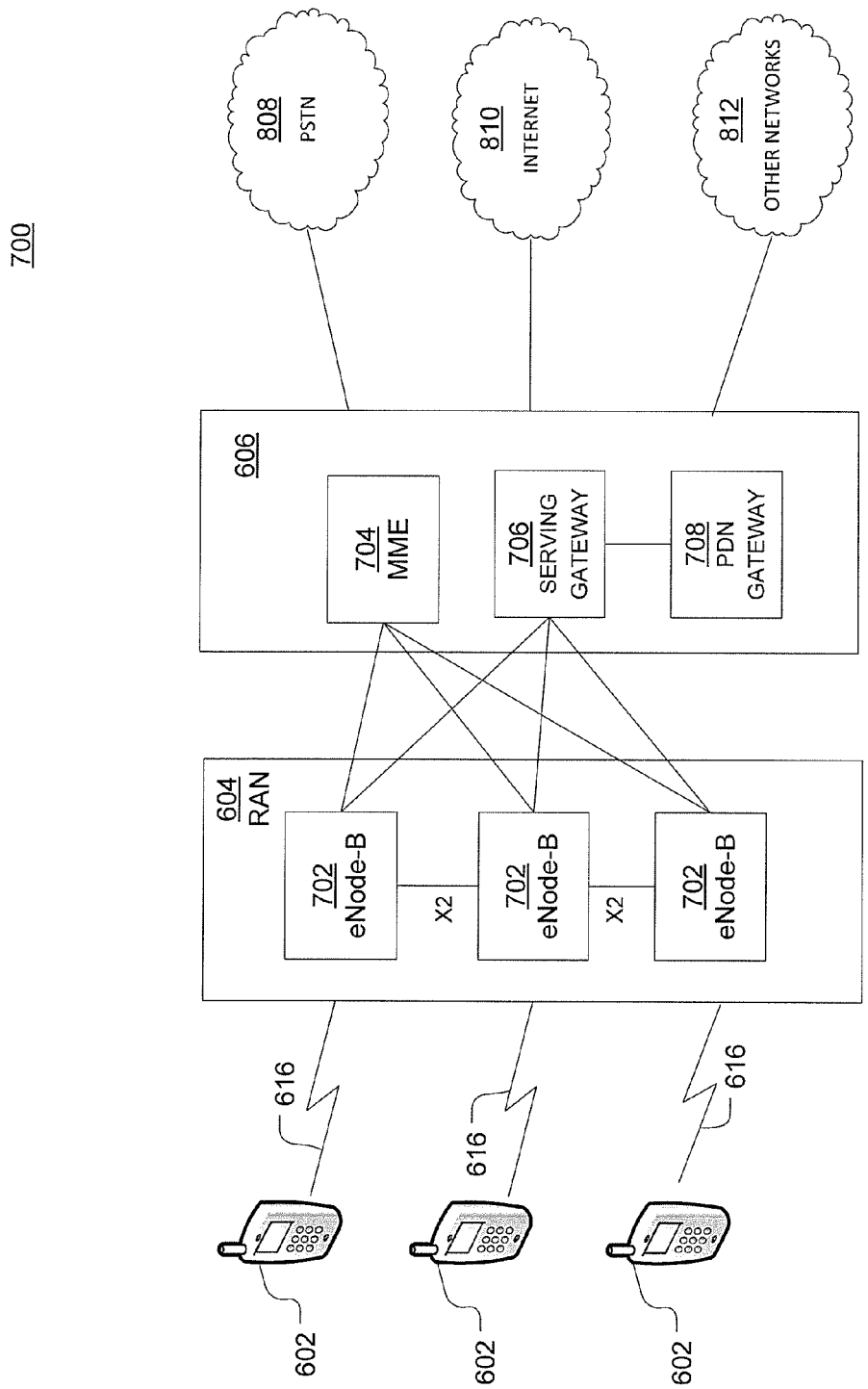
FIG. 7 is an example system diagram of a radio access network and a core network.

FIG. 7 is an example system 700 including RAN 604 and core network 606. As noted above, RAN 604 may employ an E-UTRA radio technology to communicate with WTRUs 602 over air interface 614. RAN 604 may also be in communication with core network 606.

RAN 604 may include any number of eNode-Bs 702 while remaining consistent with the disclosed technology. One or more eNode-Bs 702 may include one or more transceivers for communicating with the WTRUs 602 over the air interface 614. Optionally, eNode-Bs 702 may implement MIMO technology. Thus, one of eNode-Bs 702, for example, may use multiple antennas to transmit wireless signals to, or receive wireless signals from, one of WTRUs 602.

Each of eNode-Bs 702 may be associated with a particular cell (not shown) and may be configured to handle radio resource management decisions, handover decisions, scheduling of users in the uplink or downlink, or the like. As shown in FIG. 7 eNode-Bs 702 may communicate with one another over an X2 interface.

Core network 606 shown in FIG. 7 may include a mobility management gateway or entity (MME) 704, a serving gateway 706, or a packet data network (PDN) gateway 708. While each of the foregoing elements are depicted as part of core network 606, it will be appreciated that any one of these elements may be owned or operated by an entity other than the core network operator.

MME 704 may be connected to each of eNode-Bs 702 in RAN 604 via an S1 interface and may serve as a control node. For example, MME 704 may be responsible for authenticating users of WTRUs 602, bearer activation or deactivation, selecting a particular serving gateway during an initial attach of WTRUs 602, or the like. MME 704 may also provide a control plane function for switching between RAN 604 and other RANs (not shown) that employ other radio technologies, such as GSM or WCDMA.

Serving gateway 706 may be connected to each of eNode-Bs 702 in RAN 604 via the 51 interface. Serving gateway 706 may generally route or forward user data packets to or from the WTRUs 602. Serving gateway 706 may also perform other functions, such as anchoring user planes during inter-eNode B handovers, triggering paging when downlink data is available for WTRUs 602, managing or storing contexts of WTRUs 602, or the like.

Serving gateway 706 may also be connected to PDN gateway 146, which may provide WTRUs 602 with access to packet-switched networks, such as Internet 610, to facilitate communications between WTRUs 602 and IP-enabled devices.

Core network 606 may facilitate communications with other networks. For example, core network 606 may provide WTRUs 602 with access to circuit-switched networks, such as PSTN 608, to facilitate communications between WTRUs 602 and traditional land-line communications devices. In addition, core network 606 may provide the WTRUs 602 with access to other networks 612, which may include other wired or wireless networks that are owned or operated by other service providers.

Figure 8:
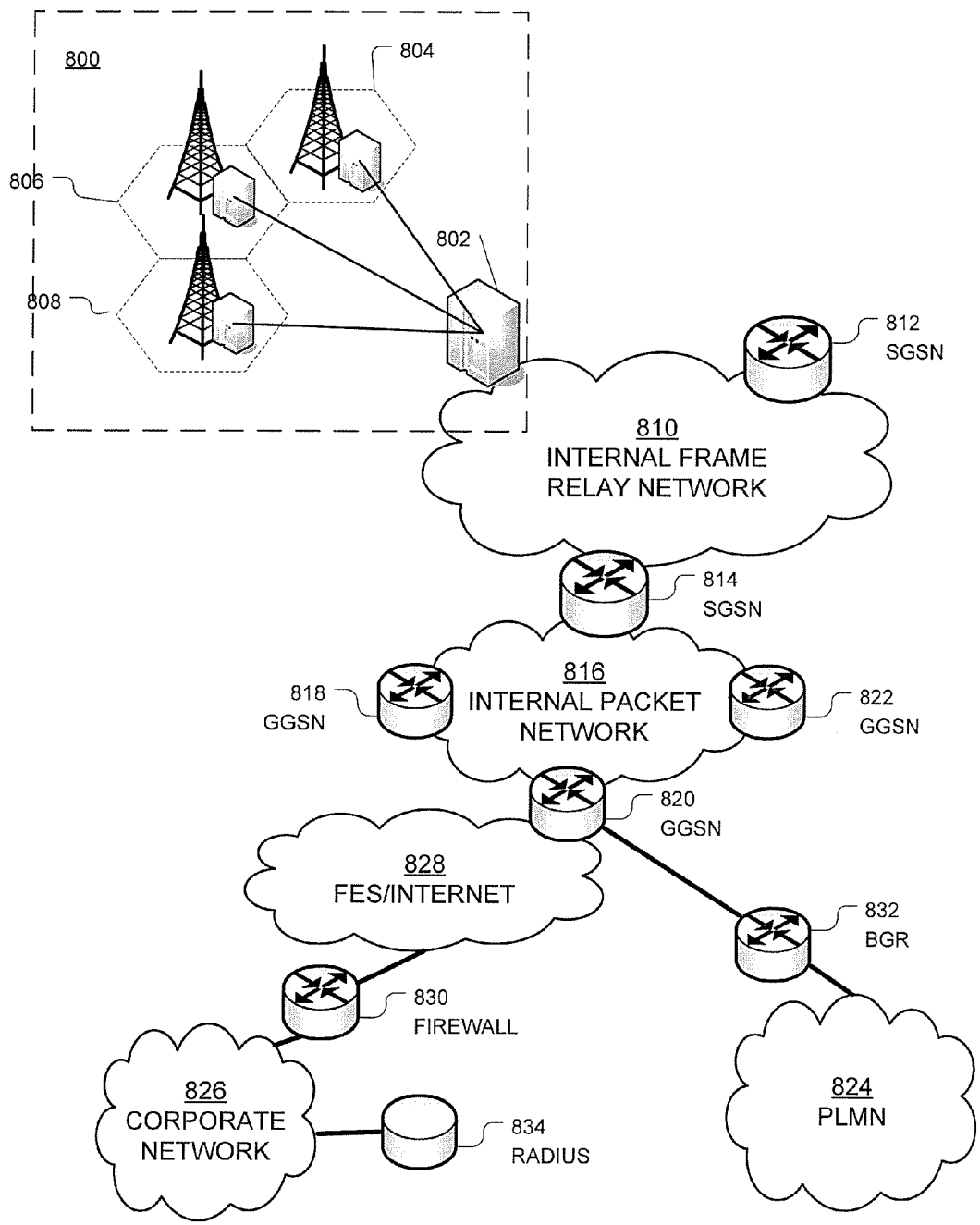
FIG. 8 depicts an overall block diagram of an example packet-based mobile cellular network environment, such as a general packet radio service (GPRS) network.

FIG. 8 depicts an overall block diagram of an example packet-based mobile cellular network environment, such as a GPRS network as described herein. In the example packet-based mobile cellular network environment shown in FIG. 8, there are a plurality of base station subsystems (BSS) 800 (only one is shown), each of which comprises a base station controller (BSC) 802 serving a plurality of BTSs, such as BTSs 804, 806, 808. BTSs 804, 806, 808 are the access points where users of packet-based mobile devices become connected to the wireless network. In example fashion, the packet traffic originating from mobile devices is transported via an over-the-air interface to BTS 808, and from BTS 808 to BSC 802. Base station subsystems, such as BSS 800, are a part of internal frame relay network 810 that can include a service GPRS support nodes (SGSN), such as SGSN 812 or SGSN 814. Each SGSN 812, 814 is connected to an internal packet network 816 through which SGSN 812, 814 can route data packets to or from a plurality of gateway GPRS support nodes (GGSN) 818, 820, 822. As illustrated, SGSN 814 and GGSNs 818, 820, 822 are part of internal packet network 816. GGSNs 818, 820, 822 mainly provide an interface to external IP networks such as PLMN 824, corporate intranets/internets 826, or Fixed-End System (FES) or the public Internet 828. As illustrated, subscriber corporate network 826 may be connected to GGSN 820 via a firewall 830. PLMN 824 may be connected to GGSN 820 via a boarder gateway router (BGR) 832. A Remote Authentication Dial-In User Service (RADIUS) server 834 may be used for caller authentication when a user calls corporate network 826.

Generally, there may be a several cell sizes in a GSM network, referred to as macro, micro, pico, femto or umbrella cells. The coverage area of each cell is different in different environments. Macro cells can be regarded as cells in which the base station antenna is installed in a mast or a building above average roof top level. Micro cells are cells whose antenna height is under average roof top level. Micro cells are typically used in urban areas. Pico cells are small cells having a diameter of a few dozen meters. Pico cells are used mainly indoors. Femto cells have the same size as pico cells, but a smaller transport capacity. Femto cells are used indoors, in residential or small business environments. On the other hand, umbrella cells are used to cover shadowed regions of smaller cells and fill in gaps in coverage between those cells.

Figure 9:
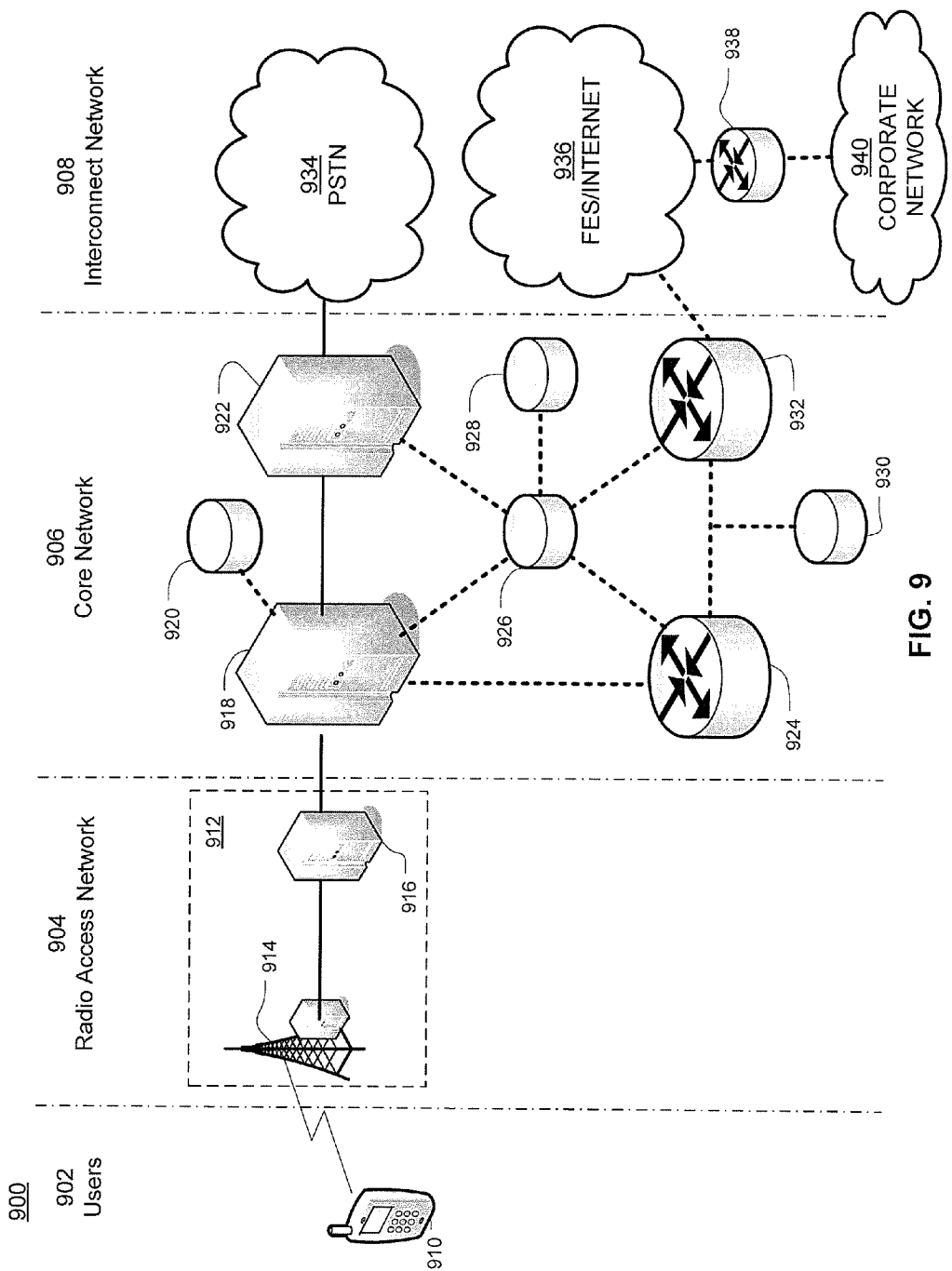
FIG. 9 illustrates an exemplary architecture of a GPRS network.

FIG. 9 illustrates an architecture of a typical GPRS network 900 as described herein. The architecture depicted in FIG. 9 may be segmented into four groups: users 902, RAN 904, core network 906, and interconnect network 908. Users 902 comprise a plurality of end users, who each may use one or more devices 910. Note that device 910 is referred to as a mobile subscriber (MS) in the description of network shown in FIG. 9. In an example, device 910 comprises a communications device (e.g., mobile device 102, mobile positioning center 116, network entity 300, any of detected devices 500, second device 508, access device 604, access device 606, access device 608, access device 610 or the like, or any combination thereof). Radio access network 904 comprises a plurality of BSSs such as BSS 912, which includes a BTS 914 and a BSC 916. Core network 906 may include a host of various network elements. As illustrated in FIG. 9, core network 906 may comprise MSC 918, service control point (SCP) 920, gateway MSC (GMSC) 922, SGSN 924, home location register (HLR) 926, authentication center (AuC) 928, domain name system (DNS) server 930, and GGSN 932. Interconnect network 908 may also comprise a host of various networks or other network elements. As illustrated in FIG. 9, interconnect network 908 comprises a PSTN 934, an FES/Internet 936, a firewall 1138, or a corporate network 940.

An MSC can be connected to a large number of BSCs. At MSC 918, for instance, depending on the type of traffic, the traffic may be separated in that voice may be sent to PSTN 934 through GMSC 922, or data may be sent to SGSN 924, which then sends the data traffic to GGSN 932 for further forwarding.

When MSC 918 receives call traffic, for example, from BSC 916, it sends a query to a database hosted by SCP 920, which processes the request and issues a response to MSC 918 so that it may continue call processing as appropriate.

HLR 926 is a centralized database for users to register to the GPRS network. HLR 926 stores static information about the subscribers such as the International Mobile Subscriber Identity (IMSI), subscribed services, or a key for authenticating the subscriber. HLR 926 also stores dynamic subscriber information such as the current location of the MS. Associated with HLR 926 is AuC 928, which is a database that contains the algorithms for authenticating subscribers and includes the associated keys for encryption to safeguard the user input for authentication.

In the following, depending on context, "mobile subscriber" or "MS" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 9, when MS 910 initiates the attach process by turning on the network capabilities of the mobile device, an attach request is sent by MS 910 to SGSN 924. The SGSN 924 queries another SGSN, to which MS 910 was attached before, for the identity of MS 910. Upon receiving the identity of MS 910 from the other SGSN, SGSN 924 requests more information from MS 910. This information is used to authenticate MS 910 to SGSN 924 by HLR 926. Once verified, SGSN 924 sends a location update to HLR 926 indicating the change of location to a new SGSN, in this case SGSN 924. HLR 926 notifies the old SGSN, to which MS 910 was attached before, to cancel the location process for MS 910. HLR 926 then notifies SGSN 924 that the location update has been performed. At this time, SGSN 924 sends an Attach Accept message to MS 910, which in turn sends an Attach Complete message to SGSN 924.

After attaching itself with the network, MS 910 then goes through the authentication process. In the authentication process, SGSN 924 sends the authentication information to HLR 926, which sends information back to SGSN 924 based on the user profile that was part of the user's initial setup. SGSN 924 then sends a request for authentication and ciphering to MS 910. MS 910 uses an algorithm to send the user identification and password to SGSN 924. SGSN 924 uses the same algorithm and compares the result. If a match occurs, SGSN 924 authenticates MS 910.

Next, MS 910 establishes a user session with the destination network, corporate network 940, by going through a Packet Data Protocol (PDP) activation process. Briefly, in the process, MS 910 requests access to the Access Point Name (APN), for example, UPS.com, and SGSN 924 receives the activation request from MS 910. SGSN 924 then initiates a DNS query to learn which GGSN 932 has access to the UPS.com APN. The DNS query is sent to a DNS server within core network 906, such as DNS server 930, which is provisioned to map to one or more GGSNs in core network 906. Based on the APN, the mapped GGSN 932 can access requested corporate network 940. SGSN 924 then sends to GGSN 932 a Create PDP Context Request message that contains necessary information. GGSN 932 sends a Create PDP Context Response message to SGSN 924, which then sends an Activate PDP Context Accept message to MS 910.

Once activated, data packets of the call made by MS 910 can then go through RAN 904, core network 906, and interconnect network 908, in a particular FES/Internet 936 and firewall 1138, to reach corporate network 940.

Figure 10:
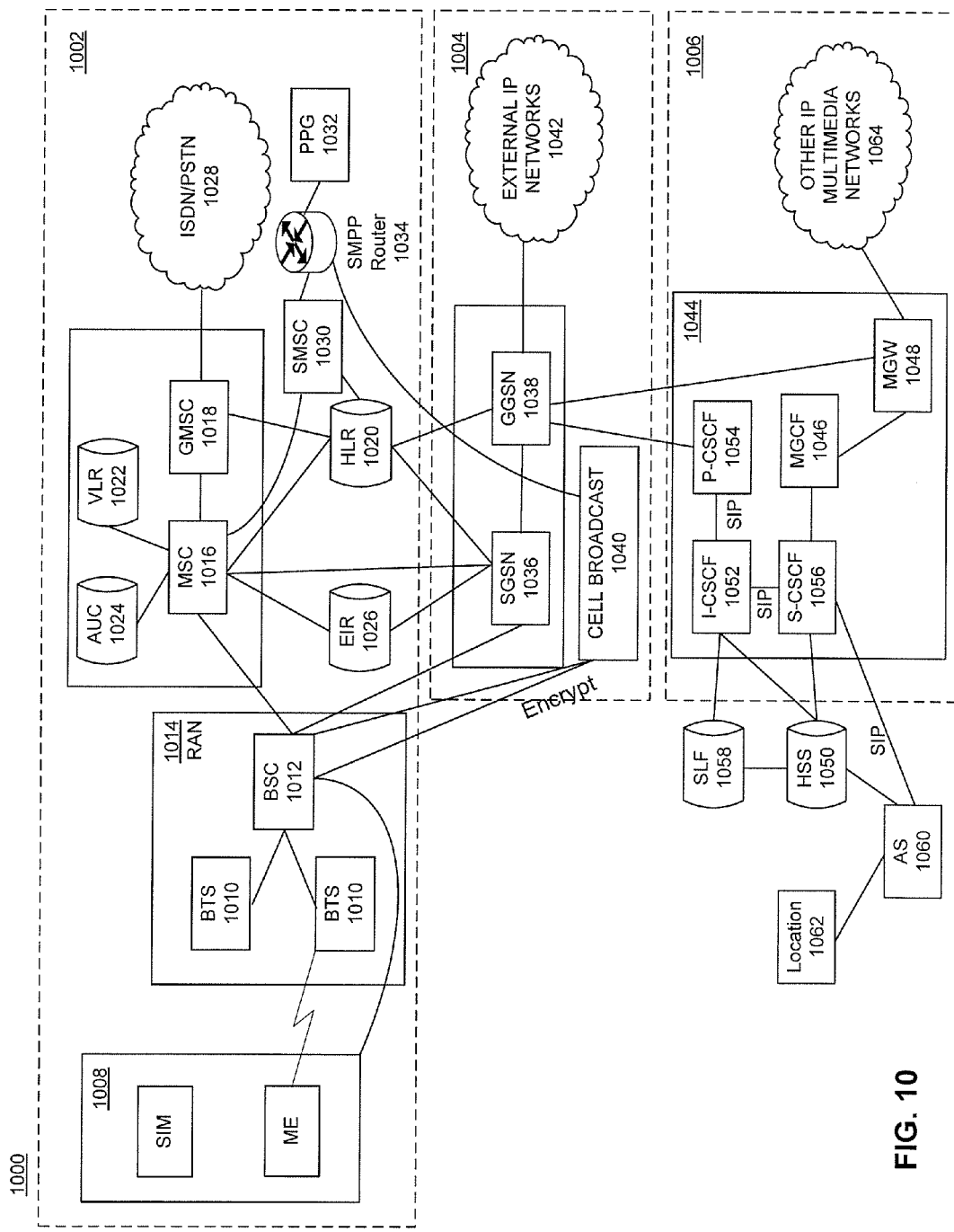
FIG. 10 illustrates an example block diagram view of a global system for mobile communications (GSM)/GPRS/internet protocol (IP) multimedia network architecture.

FIG. 10 illustrates an example block diagram view of a GSM/GPRS/IP multimedia network architecture 1000 as described herein. As illustrated, architecture 1000 includes a GSM core network 1002, a GPRS network 1004 and an IP multimedia network 1006. GSM core network 1002 includes an MS 1008, a BTS 1010, and a BSC 1012. MS 1008 is physical equipment or mobile equipment, such as a mobile phone or a laptop computer that is used by mobile subscribers, with a SIM or a Universal Integrated Circuit Card (UICC). The SIM or UICC includes an IMSI which is a unique identifier of a subscriber. BTS 1010 is physical equipment, such as a radio tower, that enables a radio interface to communicate with MS 1008. Each BTS 1010 may serve more than one MS 1008. BSC 1012 manages radio resources, including BTS 1010. BSC 1010 may be connected to several BTSs 1010. BSC 1012 and BTS 1010 components, in combination, are generally referred to as a BSS or RAN 1014.

GSM core network 1002 also includes a MSC 1016, a GMSC 1018, an HLR 1020, a visitor location register (VLR) 1022, an AuC 1024, and an equipment identity register (EIR) 1026. MSC 1016 performs a switching function for the network. MSC 1016 also performs other functions, such as registration, authentication, location updating, handovers, or call routing. GMSC 1018 provides a gateway between GSM network 1002 and other networks, such as an Integrated Services Digital Network (ISDN) or PSTN 1028. Thus, the GMSC 1018 provides interworking functionality with external networks.

HLR 1020 is a database that contains administrative information regarding each subscriber registered in corresponding GSM network 1002. HLR 1020 also contains the current location of each MS. VLR 1022 is a database that contains selected administrative information from HLR 1020. VLR 1022 contains information necessary for call control and provision of subscribed services for each MS1008 currently located in a geographical area controlled by VLR 1022. HLR 1020 and VLR 1022, together with MSC 1016, provide the call routing and roaming capabilities of GSM. AuC 1024 provides the parameters needed for authentication and encryption functions. Such parameters allow verification of a subscriber's identity. EIR 1026 stores security-sensitive information about the mobile equipment.

An SMSC 1030 allows one-to-one short message service (SMS) messages to be sent to or from MS 1008. A push proxy gateway (PPG) 1032 is used to "push" (i.e., send without a synchronous request) content to MS 1008. PPG 1032 acts as a proxy between wired and wireless networks to facilitate pushing of data to MS 802. A short message peer-to-peer (SMPP) protocol router 1034 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, or SMS, MS 1008 first registers with the network to indicate its current location by performing a location update and IMSI attach procedure. MS 1008 sends a location update including its current location information to the MSC 1016/VLR 1022, via BTS 1010 and the BSC 1012. The location information is then sent to HLR 1020 of MS 1008. HLR 1020 is updated with the location information received from the MSC 1016/VLR 1022. The location update also is performed when MS 1008 moves to a new location area. Typically, the location update is periodically performed to update the database as location updating events occur.

GPRS network 1004 is logically implemented on GSM core network 1002 architecture by introducing two packet-switching network nodes, an SGSN 1036, a cell broadcast and a GGSN 1038. SGSN 1036 is at the same hierarchical level as MSC 1016 in GSM network 1002. SGSN 1036 controls the connection between GPRS network 1004 and MS 1008. SGSN 1036 also keeps track of individual MS 1008's locations and security functions and access controls.

A cell broadcast center (CBC) 1040 communicates cell broadcast messages that are typically delivered to multiple users in a specified area. Cell broadcast is one-to-many geographically focused service. It enables messages to be communicated to multiple mobile phone customers who are located within a given part of its network coverage area at the time the message is broadcast.

GGSN 1038 provides a gateway between GPRS network 1002 and a PDN or other external IP networks 1042. That is, GGSN 1038 provides interworking functionality with external networks, and sets up a logical link to MS 1008 through SGSN 1036. When packet-switched data leaves GPRS network 1004, it is transferred to a TCP-IP network 1042, such as an X.25 network or the Internet. In order to access GPRS services, MS 1008 first attaches itself to GPRS network 1004 by performing an attach procedure. MS 1008 then activates a PDP context, thus activating a packet communication session between MS 1008, SGSN 1036, and GGSN 1038.

In a GSM/GPRS network, GPRS services and GSM services can be used in parallel. MS 1008 can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

GPRS network 1004 can be designed to operate in three network operation modes (NOM1, NOM2 and NOM3). A network operation mode of GPRS network 1004 is indicated by a parameter in system information messages transmitted within a cell. The system information messages dictates MS 1008 where to listen for paging messages and how to signal towards the network. The network operation mode represents the capabilities of GPRS network 1004. In a NOM1 network, MS 1008 can receive pages from a circuit switched domain (voice call) when engaged in a data call. MS 1008 can suspend the data call or take both simultaneously, depending on the ability of MS 1008 S. In a NOM2 network, MS 1008 may not receive pages from a circuit switched domain when engaged in a data call, since MS 1008 is receiving data and is not listening to a paging channel. In a NOM3 network, MS 1008 can monitor pages for a circuit switched network while receiving data and vice versa.

IP multimedia network 1006 was introduced with 3GPP Release 5, and includes an IP multimedia subsystem (IMS) 1044 to provide rich multimedia services to end users. A representative set of the network entities within IMS 1044 are a call/session control function (CSCF), a media gateway control function (MGCF) 1046, a media gateway (MGW) 1048, and a master subscriber database, called a home subscriber server (HSS) 1050. HSS 1050 may be common to GSM network 1002, GPRS network 1004 as well as IP multimedia network 1006.

IMS 1044 is built around the call/session control function, of which there are three types: an interrogating CSCF (I-CSCF) 1052, a proxy CSCF (P-CSCF) 1054, and a serving CSCF (S-CSCF) 1056. P-CSCF 1054 is the MS 1008's first point of contact with IMS 1044. P-CSCF 1054 forwards session initiation protocol (SIP) messages received from MS 1008 to an SIP server in a home network (and vice versa) of MS 1008. P-CSCF 1054 may also modify an outgoing request according to a set of rules defined by the network operator (for example, address analysis or potential modification).

I-CSCF 1052 forms an entrance to a home network and hides the inner topology of the home network from other networks and provides flexibility for selecting an S-CSCF 1056. I-CSCF 1052 may contact a subscriber location function (SLF) 1058 to determine which HSS 1050 to use for the particular subscriber, if multiple HSSs 1050 are present. S-CSCF 1056 performs the session control services for MS 1008. This includes routing originating sessions to external networks and routing terminating sessions to visited networks. S-CSCF 1056 also decides whether an application server (AS) 1060 is required to receive information on an incoming SIP session request to ensure appropriate service handling. This decision is based on information received from HSS 1050 (or other sources, such as AS 1060). AS 1060 also communicates to a location server 1062 (e.g., a GMLC) that provides a position (e.g., latitude/longitude coordinates) of MS 1008.

HSS 1050 contains a subscriber profile and keeps track of which core network node is currently handling the subscriber. It also supports subscriber authentication and authorization functions. In networks with more than one HSS 1050, SLF 1058 may provide information on the HSS 1050 that contains the profile of a given subscriber.

MGCF 1046 provides interworking functionality between SIP session control signaling from IMS 1044 and ISUP/BICC call control signaling from the external GSTN networks (not shown). It also controls a MGW 1048 that provides user-plane interworking functionality (e.g., converting between AMR- and PCM-coded voice). MGW 1048 also communicates with other IP multimedia networks 1064.

Push to Talk over Cellular (PoC)-capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the predefined area.

Figure 11:
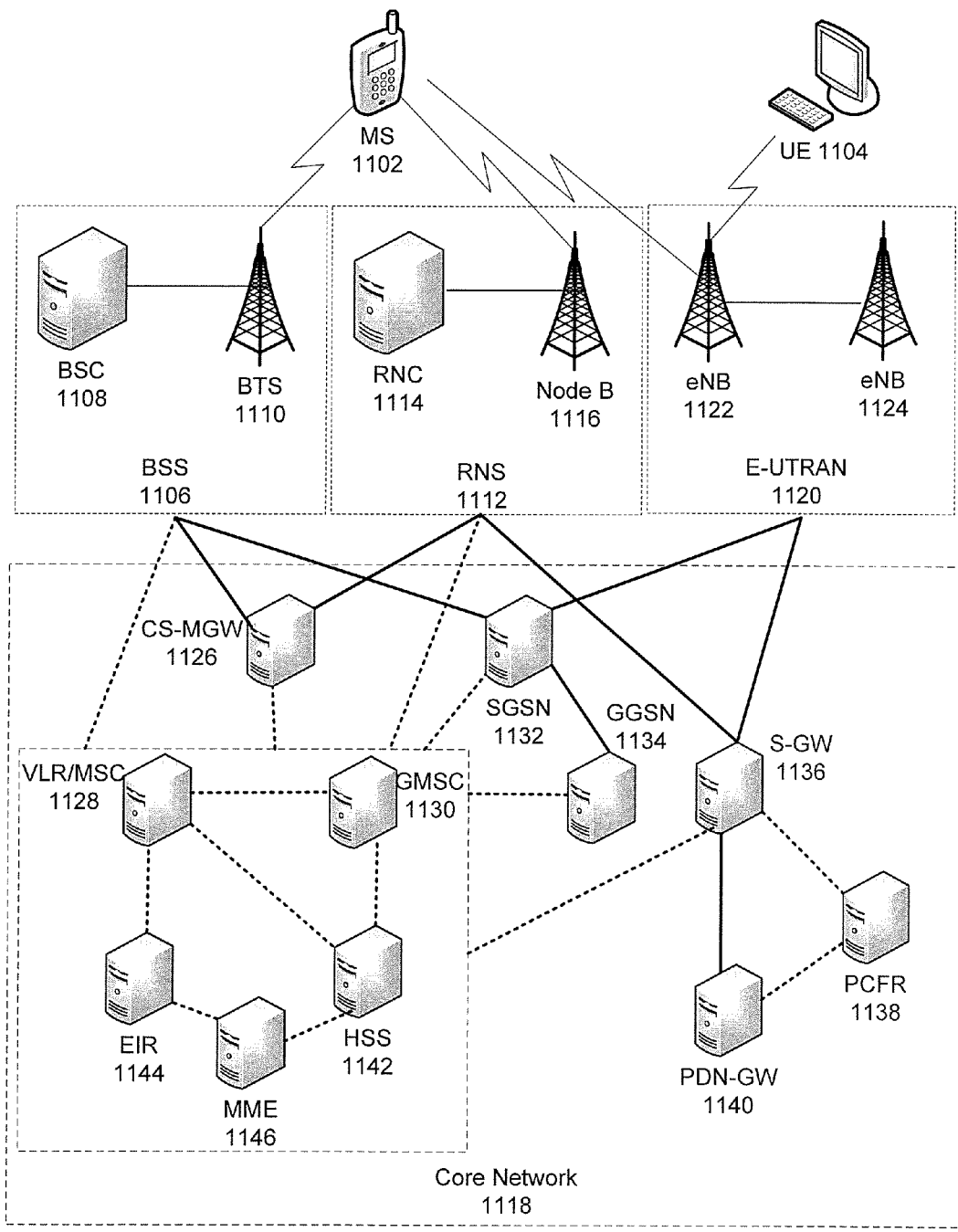
FIG. 11 is a block diagram of an exemplary public land mobile network (PLMN).

FIG. 11 illustrates a PLMN block diagram view of an example architecture that may be replaced by a telecommunications system. In FIG. 11, solid lines may represent user traffic signals, and dashed lines may represent support signaling. MS 1102 is the physical equipment used by the PLMN subscriber. For example, mobile device 102, network entity 300, the like, or any combination thereof may serve as MS 1102. MS 1102 may be one of, but not limited to, a cellular telephone, a cellular telephone in combination with another electronic device or any other wireless mobile communication device.

MS 1102 may communicate wirelessly with BSS 1106. BSS 1106 contains BSC 1108 and a BTS 1110. BSS 1106 may include a single BSC 1108/BTS 1110 pair (base station) or a system of BSC/BTS pairs that are part of a larger network. BSS 1106 is responsible for communicating with MS 1102 and may support one or more cells. BSS 1106 is responsible for handling cellular traffic and signaling between MS 1102 and a core network 1118. Typically, BSS 1106 performs functions that include, but are not limited to, digital conversion of speech channels, allocation of channels to mobile devices, paging, or transmission/reception of cellular signals.

Additionally, MS 1102 may communicate wirelessly with RNS 1112. RNS 1112 contains a Radio Network Controller (RNC) 1114 and one or more Nodes B 1116. RNS 1112 may support one or more cells. RNS 1112 may also include one or more RNC 1114/Node B 1116 pairs or alternatively a single RNC 1114 may manage multiple Nodes B 1116. RNS 1112 is responsible for communicating with MS 1102 in its geographically defined area. RNC 1114 is responsible for controlling Nodes B 1116 that are connected to it and is a control element in a UMTS radio access network. RNC 1114 performs functions such as, but not limited to, load control, packet scheduling, handover control, security functions, or controlling MS 1102 access to core network 1118.

An E-UTRA Network (E-UTRAN) 1120 is a RAN that provides wireless data communications for MS 1102 and user equipment 1104. E-UTRAN 1120 provides higher data rates than traditional UMTS. It is part of the LTE upgrade for mobile networks, and later releases meet the requirements of the International Mobile Telecommunications (IMT) Advanced and are commonly known as a 4G networks. E-UTRAN 1120 may include of series of logical network components such as E-UTRAN Node B (eNB) 1122 and E-UTRAN Node B (eNB) 1124. E-UTRAN 1120 may contain one or more eNBs. User equipment 1104 may be any mobile device capable of connecting to E-UTRAN 1120 including, but not limited to, a personal computer, laptop, mobile device, wireless router, or other device capable of wireless connectivity to E-UTRAN 1120. The improved performance of the E-UTRAN 1120 relative to a typical UMTS network allows for increased bandwidth, spectral efficiency, and functionality including, but not limited to, voice, high-speed applications, large data transfer or IPTV, while still allowing for full mobility.

An example of a mobile data and communication service that may be implemented in the PLMN architecture described in FIG. 11 is EDGE. EDGE is an enhancement for GPRS networks that implements an improved signal modulation scheme known as 8-PSK (phase shift keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically MS 1102 may communicate with any or all of BSS 1106, RNS 1112, or E-UTRAN 1120. In a illustrative system, each of BSS 1106, RNS 1112, and E-UTRAN 1120 may provide Mobile Station 1102 with access to core network 1118. Core network 1118 may include of a series of devices that route data and communications between end users. Core network 1118 may provide network service functions to users in the circuit switched (CS) domain or the packet switched (PS) domain. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The circuit-switched MGW function (CS-MGW) 1126 is part of core network 1118, and interacts with VLR/MSC server 1128 and GMSC server 1130 in order to facilitate core network 1118 resource control in the CS domain. Functions of CS-MGW 1126 include, but are not limited to, media conversion, bearer control, payload processing or other mobile network processing such as handover or anchoring. CS-MGW 1118 may receive connections to MS 1102 through BSS 1106 or RNS 1112.

SGSN 1132 stores subscriber data regarding MS 1102 in order to facilitate network functionality. SGSN 1132 may store subscription information such as, but not limited to, the IMSI, temporary identities, or PDP addresses. SGSN 1132 may also store location information such as, but not limited to, GGSN 1134 address for each GGSN where an active PDP exists. GGSN 1134 may implement a location register function to store subscriber data it receives from SGSN 1132 such as subscription or location information.

Serving gateway (S-GW) 1136 is an interface which provides connectivity between E-UTRAN 1120 and core network 1118. Functions of S-GW 1136 include, but are not limited to, packet routing, packet forwarding, transport level packet processing, event reporting to Policy and Charging Rules Function (PCRF) 1138, or mobility anchoring for inter-network mobility. PCRF 1138 uses information gathered from S-GW 1136, as well as other sources, to make applicable policy and charging decisions related to data flows, network resources or other network administration functions. PDN gateway (PDN-GW) 1140 may provide user-to-services connectivity functionality including, but not limited to, network-wide mobility anchoring, bearer session anchoring and control, or IP address allocation for PS domain connections.

HSS 1142 is a database for user information and stores subscription data regarding MS 1102 or user equipment 1104 for handling calls or data sessions. Networks may contain one HSS 1142 or more if additional resources are required. Example data stored by HSS 1142 include, but is not limited to, user identification, numbering or addressing information, security information, or location information. HSS 1142 may also provide call or session establishment procedures in both the PS and CS domains.

VLR/MSC Server 1128 provides user location functionality. When MS 1102 enters a new network location, it begins a registration procedure. A MSC server for that location transfers the location information to the VLR for the area. A VLR and MSC server may be located in the same computing environment, as is shown by VLR/MSC server 1128, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for MS 1102 registration or procedures for handover of MS 1102 to a different section of core network 1118. GMSC server 1130 may serve as a connection to alternate GMSC servers for other MSs in larger networks.

EIR 1144 is a logical element which may store the IMEI for MS 1102. User equipment may be classified as either "white listed" or "black listed" depending on its status in the network. If MS 1102 is stolen and put to use by an unauthorized user, it may be registered as "black listed" in EIR 1144, preventing its use on the network. A MME 1146 is a control node which may track MS 1102 or user equipment 1104 if the devices are idle. Additional functionality may include the ability of MME 1146 to contact idle MS 1102 or user equipment 1104 if retransmission of a previous session is required.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which the broadcasting of messages that provide instructions to mobile devices may be determined have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

What is claimed:

1. A device comprising:
a processor; and
memory coupled to the processor, the memory comprising executable instructions that, cause the processor to effectuate operations comprising:
 based at least on the device being Wireless Emergency Alert (WEA)-enabled, receiving a WEA message comprising a communication from Federal Emergency Management Agency's (FEMA's) Integrated Public Alert and Warning System (IPAWS);
 determining that a type of the WEA message comprises a first type and a second type;
 responsive to the WEA message being the first type, accessing a URL to retrieve, from a network device, a first data indicated by the WEA message, the first data comprising a software;
 responsive to the WEA message being the second type, installing the software; and
 displaying the communication from FEMA's IPAWS.

2. The device of claim 1, further comprising providing a second data to a recipient indicated by the WEA message.

3. The device of claim 1, wherein the data further comprises information related to an emergency indicated by the WEA message.

4. The device of claim 1, wherein the software comprises an update to an existing software of the device.

5. A method comprising:
receiving, at a Wireless Emergency Alert (WEA)-enabled device, a WEA message from Federal Emergency Management Agency's (FEMA's) Integrated Public Alert and Warning System (IPAWS);
determining that a type of the WEA message comprises a first type and a second type;
based on the WEA message being the first type, accessing a URL to retrieve a first data from a network device, the first data comprising a software;
responsive to the WEA message being the second type, installing the software; and
displaying a communication indicated by the WEA message from FEMA's IPAWS.

6. The method of claim 5, further comprising, providing a second data indicated by the WEA message to a recipient.

7. The method of claim 5, wherein the first data further comprises information related to an emergency indicated by the WEA message.

8. A non-transitory computer readable storage medium comprising executable instructions that cause a processor of a device executing the executable instructions to effectuate operations comprising:
 based at least on the device being Wireless Emergency Alert (WEA)-enabled, receiving a WEA message indicated a communication from Federal Emergency Management Agency's (FEMA's) Integrated Public Alert and Warning System (IPAWS);
 determining a type of the WEA message, wherein the type comprises a first type and a second type;
 based on the WEA message being the first type, accessing a URL to retrieve, via a network connection of the device, a first data from a network device, the first data comprising a software;
 based on the WEA message being the second type, running the software; and
 displaying the communication from FEMA's IPAWS.

9. The non-transitory computer readable storage medium of claim 8, wherein the type comprises a third type and the operations further comprise, providing a second data to a recipient indicated by the WEA message.

10. The non-transitory computer readable storage medium of claim 8, wherein running the software comprises updating an existing software of the device.

* * * * *